United States Patent
Owen et al.

(10) Patent No.: US 10,082,856 B1
(45) Date of Patent: Sep. 25, 2018

(54) PERFORMING A HEALTH CHECK ON POWER SUPPLY MODULES THAT OPERATE IN A CURRENT SHARING MODE

(71) Applicant: Juniper Networks, Inc., Sunnyvale, CA (US)

(72) Inventors: David K. Owen, Livermore, CA (US); Jaspal S. Gill, Tracy, CA (US); Katsuhiro Okamura, Watsonville, CA (US); Sylvia Toma, Hillborough, CA (US); Subramanyam Tallak, Saratoga, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 176 days.

(21) Appl. No.: 15/280,271

(22) Filed: Sep. 29, 2016

(51) Int. Cl.
*G06F 11/07* (2006.01)
*G06F 1/30* (2006.01)

(52) U.S. Cl.
CPC .............. *G06F 1/30* (2013.01); *G06F 11/079* (2013.01); *G06F 11/0721* (2013.01)

(58) Field of Classification Search
CPC .... G06F 11/1441; G06F 11/2015; G06F 1/30; G06F 1/305
USPC ...................................................... 714/14, 22
See application file for complete search history.

(56) References Cited

U.S. PATENT DOCUMENTS

| | | | | |
|---|---|---|---|---|
| 6,967,487 B2* | 11/2005 | Garnett | ................... | G01R 31/40 324/537 |
| 7,506,189 B1* | 3/2009 | Lee | ........................ | G06F 1/3203 713/322 |
| 2003/0095366 A1* | 5/2003 | Pellegrino | ................. | H02J 1/10 361/93.1 |
| 2010/0066403 A1* | 3/2010 | Furukawa | .......... | G01R 31/3004 324/764.01 |
| 2011/0131429 A1* | 6/2011 | Tajima | ..................... | G06F 1/266 713/310 |
| 2014/0049108 A1* | 2/2014 | Hsu | ............................ | H02J 3/06 307/52 |
| 2014/0111008 A1* | 4/2014 | Hardik | .................. | H02M 3/285 307/23 |
| 2014/0277802 A1* | 9/2014 | Tomas | ...................... | G06F 1/30 700/292 |
| 2014/0300192 A1* | 10/2014 | Price | ......................... | G06F 1/26 307/53 |
| 2015/0180342 A1* | 6/2015 | Yang | ....................... | H02J 1/102 323/268 |
| 2015/0249363 A1* | 9/2015 | Humphrey, Jr. | ........ | H02J 1/102 307/44 |
| 2016/0224102 A1* | 8/2016 | Jenne | ..................... | G06F 1/3206 |
| 2016/0282892 A1* | 9/2016 | Saavedra | .................. | G05F 1/66 |

(Continued)

*Primary Examiner* — Chae M Ko
(74) *Attorney, Agent, or Firm* — Harrity & Harrity, LLP

(57) ABSTRACT

A device may select a power supply module (PSM), from a plurality of PSMs that operate in a current sharing mode, for performing a health check. The device may perform the health check on the selected PSM by iteratively modifying an output voltage of the selected PSM and monitoring for a corresponding modification in an output current of the selected PSM. The device may determine whether the selected PSM is capable of delivering a particular load without a failure based on performing the health check. The device may perform an action based on whether the selected PSM is capable of delivering the particular load without the failure.

20 Claims, 5 Drawing Sheets

(56) References Cited

U.S. PATENT DOCUMENTS

2016/0291081 A1* 10/2016 Nuessle ............. G01R 31/2834
2017/0220089 A1*  8/2017 Mathew .................. G06F 1/266

* cited by examiner

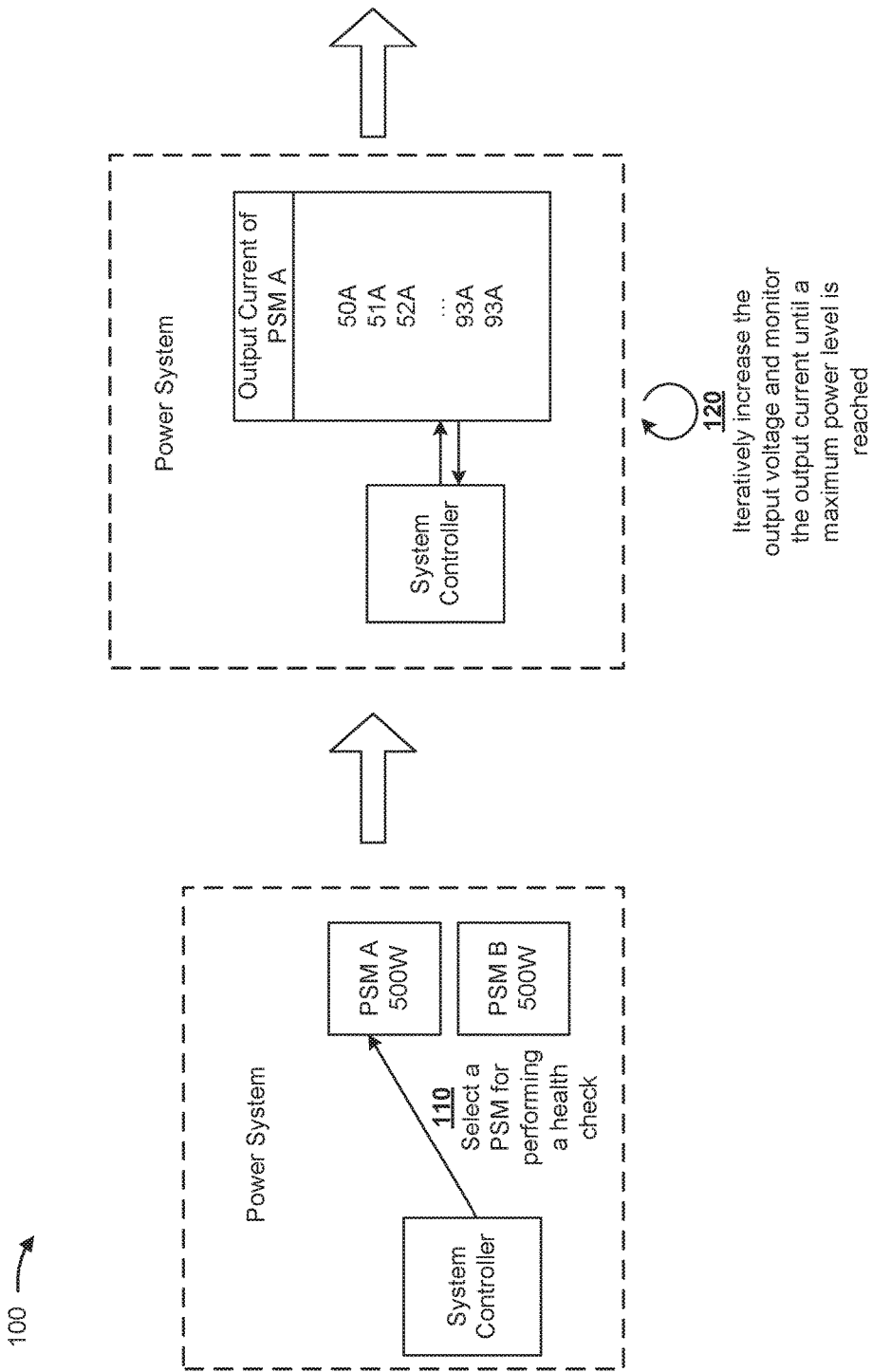

PERFORMING A HEALTH CHECK ON POWER SUPPLY MODULES THAT OPERATE IN A CURRENT SHARING MODE

BACKGROUND

A power supply module (PSM) is an electronic device that supplies electrical energy to an electrical load. The PSM may be a discrete device or may be built into another device (e.g., a power system), such as a PSM included in a desktop computer, a consumer electronics device, a network device, or the like. The power system may have multiple PSMs to supply power to one or more electrical loads associated with the power system. The power system may also have one or more backup PSMs in case of a failure by a PSM.

SUMMARY

According to some possible implementations, a device may include one or more processors to select a power supply module (PSM), from a plurality of PSMs that operate in a current sharing mode, for performing a health check. The one or more processors may perform the health check on the selected PSM by iteratively modifying an output voltage of the selected PSM and monitoring for a corresponding modification in an output current of the selected PSM. The one or more processors may determine whether the selected PSM is capable of delivering a particular load without a failure based on performing the health check. The one or more processors may perform an action based on whether the selected PSM is capable of delivering the particular load without the failure.

According to some possible implementations, a non-transitory computer-readable medium may store one or more instructions that, when executed by one or more processors, cause the one or more processors to select a power supply module (PSM), from a plurality of PSMs that operate in a current sharing mode, for performing a health check. The one or more instructions may cause the one or more processors to perform the health check on the selected PSM by iteratively modifying an output voltage of the selected PSM and monitoring for a corresponding modification in an output current of the selected PSM. The one or more instructions may cause the one or more processors to stop iteratively modifying the output voltage of the selected PSM when the modification to the output voltage fails to correspond to the modification in the output current of the selected PSM. The one or more instructions may cause the one or more processors to determine whether the selected PSM is capable of delivering a particular load without a failure based on performing the health check. The one or more instructions may cause the one or more processors to perform an action based on whether the selected PSM is capable of delivering the particular load without the failure.

According to some possible implementations, a method may include selecting, by a device, a power supply module (PSM), from a plurality of PSMs that operate in a current sharing mode, for performing a health check. The method may include performing, by the device, the health check on the selected PSM by iteratively modifying an output voltage of the selected PSM and monitoring for a corresponding modification in an output current of the selected PSM. The method may include determining, by the device, whether the selected PSM is capable of delivering a particular load based on performing the health check. The method may include performing, by the device, an action based on determining whether the selected PSM is capable of delivering the particular load.

BRIEF DESCRIPTION OF THE DRAWINGS

FIGS. 1A and 1B are diagrams of an overview of an example implementation described herein;

DETAILED DESCRIPTION

Figure 1B:
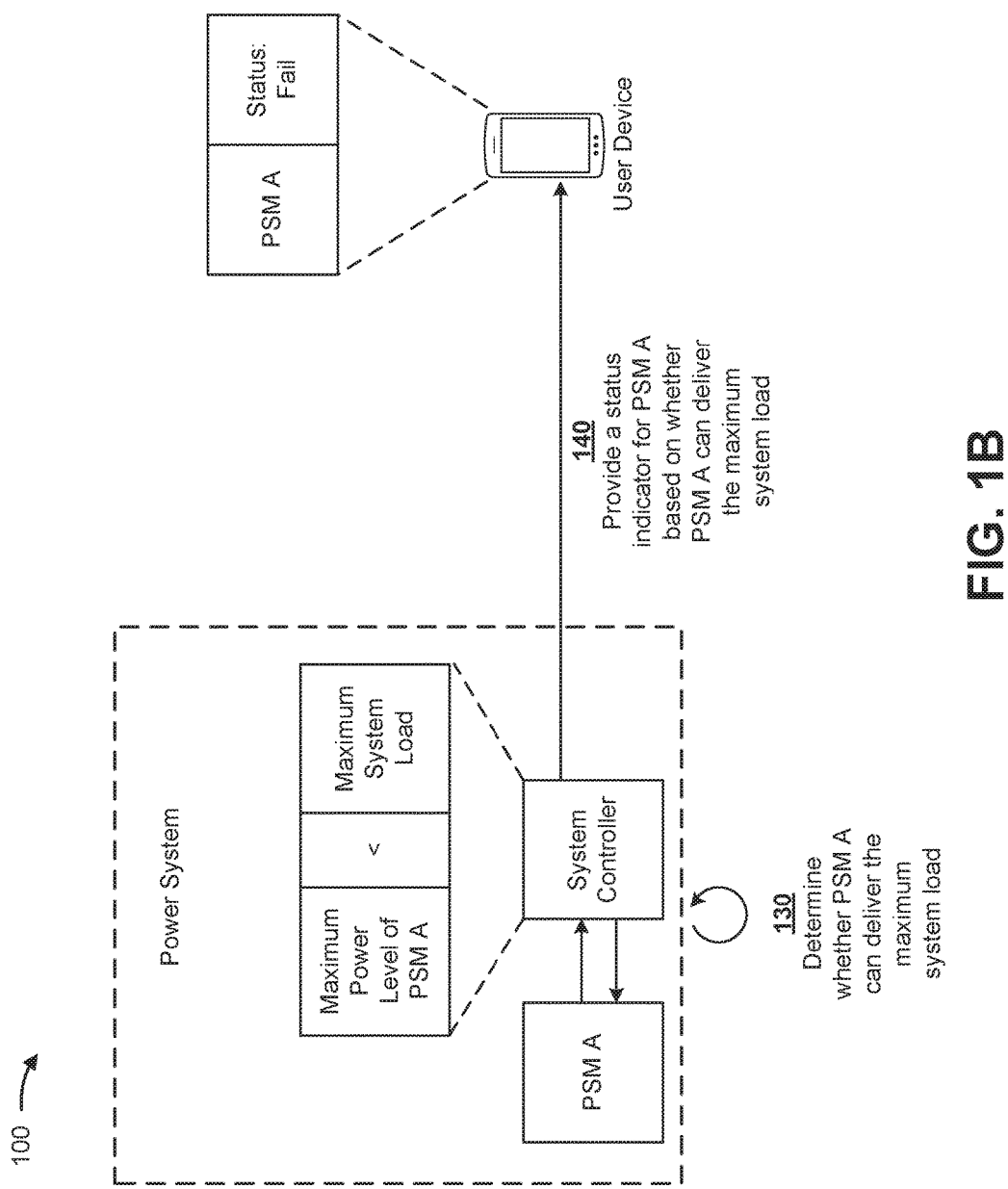

The following detailed description of example implementations refers to the accompanying drawings. The same reference numbers in different drawings may identify the same or similar elements.

Power systems may implement configurations of PSMs that provide for a quantity of primary PSMs (e.g., a required quantity of PSMs needed to power the system) and a quantity of backup PSMs. For example, if the power system has an N+N power supply configuration, then the quantity of primary PSMs (N) is equal to the quantity of backup PSMs (N). Thus, in an N+N power supply configuration, the power system includes one backup PSM for each primary PSM. Power systems with an N+A power supply configuration (where A is an integer, and 0<A<N) have N primary PSMs and A backup PSMs. In some PSM configurations, a power system may include multiple PSMs that operate in parallel to share the current. For example, if the power system has N PSMs (e.g., N=3), and the system load consumes X watts of power (e.g., X=1,500 watts (W)), then PSMs implementing a current share would equally share the power load (e.g., PSM 1 supplies 500 W, PSM 2 supplies 500 W, and PSM 3 supplies 500 W).

To prevent against loss of power, power supply manufacturers perform safety and maintenance tests on PSMs to look for abnormal conditions. Abnormal conditions may include overcurrent, under-voltage, overvoltage, over-temperature, fan failure, or the like. For example, a power supply manufacturer may test a PSM and determine that overcurrent exists (i.e., larger than intended electric current through a conductor) and that the PSM is at risk for excessive generation of heat and risk of fire or damage to the PSM.

However, safety and maintenance tests by the manufacturers of PSMs do not test the final power supply system installed by the customer. Additionally, performance capabilities of PSMs may gradually decrease over the lifespan of the product due to aging issues (e.g., cracks in a solder joint that develop over time, environment issues relating to shock and vibration, etc.). Declining performance capabilities of PSMs may cause an otherwise redundant and uninterruptable power supply system to fail to provide the necessary power to the load. For example, if a power system has N PSMs (e.g., N=3) that operate in parallel to support a system load that consumes X watts of power (e.g., X=1,500 W), the PSMs may share the load to consume X/N watts of power (e.g., 1,500 W/3=500 W). As a redundancy measure, individual PSMs may be capable of consuming up to 1,500 W of power to allow one PSM to support the full load in case the other two PSMs malfunction. If a PSM, due to an aging issue, supports less than the full system load (e.g., 1,497 W), and the remaining two PSMs malfunction, the system will unexpectedly shut down because the remaining PSM cannot support the full load (e.g., 1,500 W).

Implementations described herein prevent against catastrophic system shutdown by performing PSM health checks to verify that system redundancies are fully functional (e.g., to verify that PSMs in the power system can deliver the full system load in case of failure by other PSMs). Furthermore, the power supply system provides alerts of system deficiencies to allow an operator to take preventative and/or restorative action to avoid loss of power.

FIGS. 1A and 1B are diagrams of an overview of an example implementation 100 described herein. As shown in FIG. 1A, a power system may include two PSMs (e.g., PSM A and PSM B) that use current sharing to distribute a 1,000 W system load equally (e.g., 500 W each). As shown by reference number 110, a system controller, included in the power system, may select a PSM for performing a health check. For example, the system controller may select a first PSM (e.g., PSM A) for a first health check, and may later select a second PSM (e.g., PSM B) for a second health check. In some implementations, the power system may disable current sharing between multiple PSMs before performing a health check for an individual PSM.

As shown in FIG. 1A, assume that the power system performs the first health check. For example, the system controller of the power system may instruct PSM A to perform a first health check that determines whether PSM A can deliver the maximum system load. The power system (e.g., the system controller and/or the PSM) may determine whether PSM A can deliver the maximum system load by comparing the maximum system load to the maximum power level of the selected PSM (e.g., PSM A). In this case, the power system may begin the health check by iteratively increasing the output voltage (e.g., by 1 volt, by 10 millivolts, etc.) until the maximum output voltage is reached.

As shown by reference number 120, the power system (e.g., the system controller and/or the PSM), as part of the health check, may monitor the output current until the maximum power level is reached. For example, while the power system iteratively increases the output voltage level, the power system may monitor for a corresponding increase in output current. As shown by the table in FIG. 1A, the power system may perform an initial increase in output voltage, and this may correspond to an initial output current level of 50 amps (A). Measurements may be taken for every iterative increase and continue until an increase in the output voltage does not result in a corresponding increase in the output current. As shown, the power system may increase the output voltage, which may correspond to an output current level of 93 A. A subsequent increase in output voltage may also correspond to an output current level of 93 A. Because the increase in output voltage does not correspond to an increase in output current (e.g., the value remained at 93A), the power system may stop iteratively increasing the output voltage and determine the maximum power level. Here, the power system may multiply the final output voltage against the corresponding final output current and may store the result as the maximum power level.

As shown in FIG. 1B, and by reference number 130, the system controller of the power system may determine whether PSM A can deliver the maximum system load. For example, the system controller may determine whether PSM A can deliver the maximum system load by comparing the maximum power level of PSM A to the maximum system load. If PSM A delivers a maximum power level that is less than the maximum system load, then PSM A cannot deliver the maximum system load.

As shown by reference number 140, the system controller of the power system may provide a status indicator to a user device. For example, the system controller may provide an alert to a user device indicating that PSM A failed the health check. By alerting the user device of the health status of PSM A, a user accessing the user device may take restorative and/or preventative measures to prevent against loss of power. Additionally, the power system (e.g., the system controller and/or the PSMs) may repeat the health check for all PSMs to determine the health status for every PSM in the system (e.g., by performing a second health check on PSM B). While example implementation 100 uses two PSMs, the health check may be performed by a different quantity of PSMs.

By performing health checks on individual PSMs that operate within a group of PSMs that use current sharing, the power system ensures that individual PSMs are capable of delivering the full system load in case of a failure by one or more of the other PSMs. Furthermore, by providing alerts to the user device, an end-user may take preventative and/or restorative measures to avoid loss of power.

As indicated above, FIGS. 1A and 1B are provided merely as an example. Other examples are possible and may differ from what was described with regard to FIGS. 1A and 1B.

Figure 2:
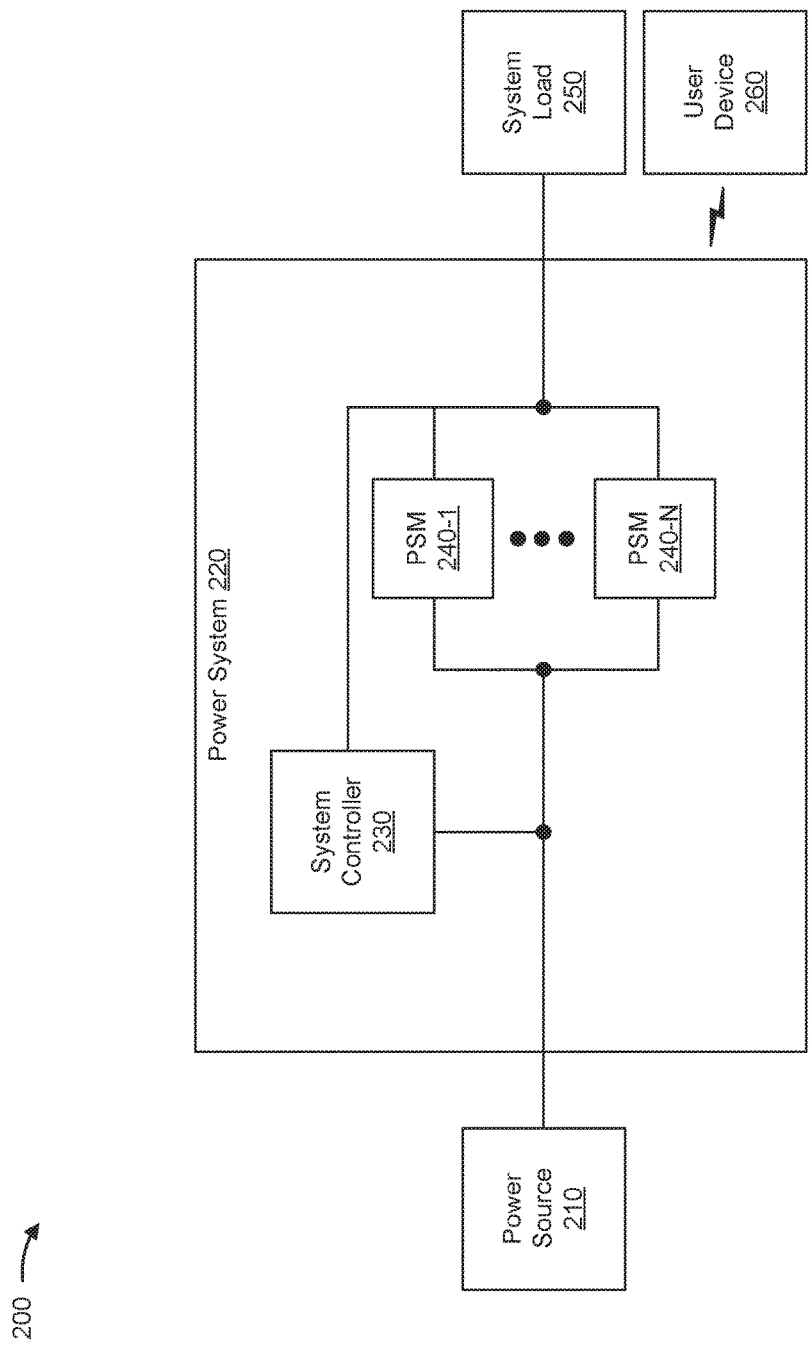
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a power source 210, a power system 220, a system controller 230, multiple PSMs 240-1 through 240-N (N>1) (hereinafter referred to individually as "PSM 240" and collectively as "PSMs 240"), a system load 250, and/or a user device 260. Devices of environment 200 may interconnect via wired connections, wireless connections, or a combination of wired and wireless connections.

Power source 210 includes one or more devices or feeds capable of providing power. For example, power source 210 may include a generator, a rectifier, a battery device (e.g., an uninterruptable power source (UPS), or the like), a feed from a power company, a feed from a power company on a circuit with a circuit breaker, a direct current (DC) power source, an alternating current (AC) power source, or the like. In some implementations, power source 210 may be capable of providing power to one or more components of power system 220.

Power system 220 includes one or more devices that power system load 250. For example, power system 220 may include system controller 230 and multiple PSMs 240, and these devices may power system load 250. In some implementations, power system 220 may use system controller 230 to send and/or receive instructions or signals from user device 260.

System controller 230 includes one or more devices capable of determining the health status of PSMs 240. For example, system controller 230 may include a processor, a microcontroller, a chip, a circuit, or the like. In some implementations, system controller 230 may send or receive signals from digital controllers of PSMs 240.

PSM 240 includes a power supply module with one or more components associated with managing, controlling, monitoring, modifying, and/or adjusting an amount of power associated with power system 220 (e.g., delivered by power system 220 to system load 250). For example, PSM 240 may include an alternating current/direct current (AC/DC) PSM, a DC/DC PSM, or the like. The quantity of PSMs may be N+N if power system 220 is an N+N power supply system. An N+N power supply system has N required PSMs 240 and N backup PSMs 240 as described herein. In some implementations, PSMs 240 may be configured to share current (e.g., via active current sharing, droop current sharing, etc.). In addition, PSM 240 may use one or more digital controllers to measure, increase, or decrease the output voltage and/or output current of PSM 240.

System load 250 includes one or more devices capable of consuming, amplifying, and/or manipulating electric power provided by power system 220. For example, system load 250 may include a server, a group of servers (e.g., in a data center), or the like. In some implementations, PSMs 240 may deliver the electric power consumed by system load 250.

User device 260 includes one or more devices capable of receiving, generating, storing, processing, and/or providing information associated with power system 220. For example, user device 260 may include a computing device, such as a server, a group of servers, a mobile phone (e.g., a smart phone, radiotelephone, etc.), a laptop computer, a tablet computer, a handheld computer, a wearable device (e.g., smart glasses or a smart watch), or a similar type of device. In some implementations, user device 260 may receive, from power system 220, an alert indicating the health status of one or more PSMs 240.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
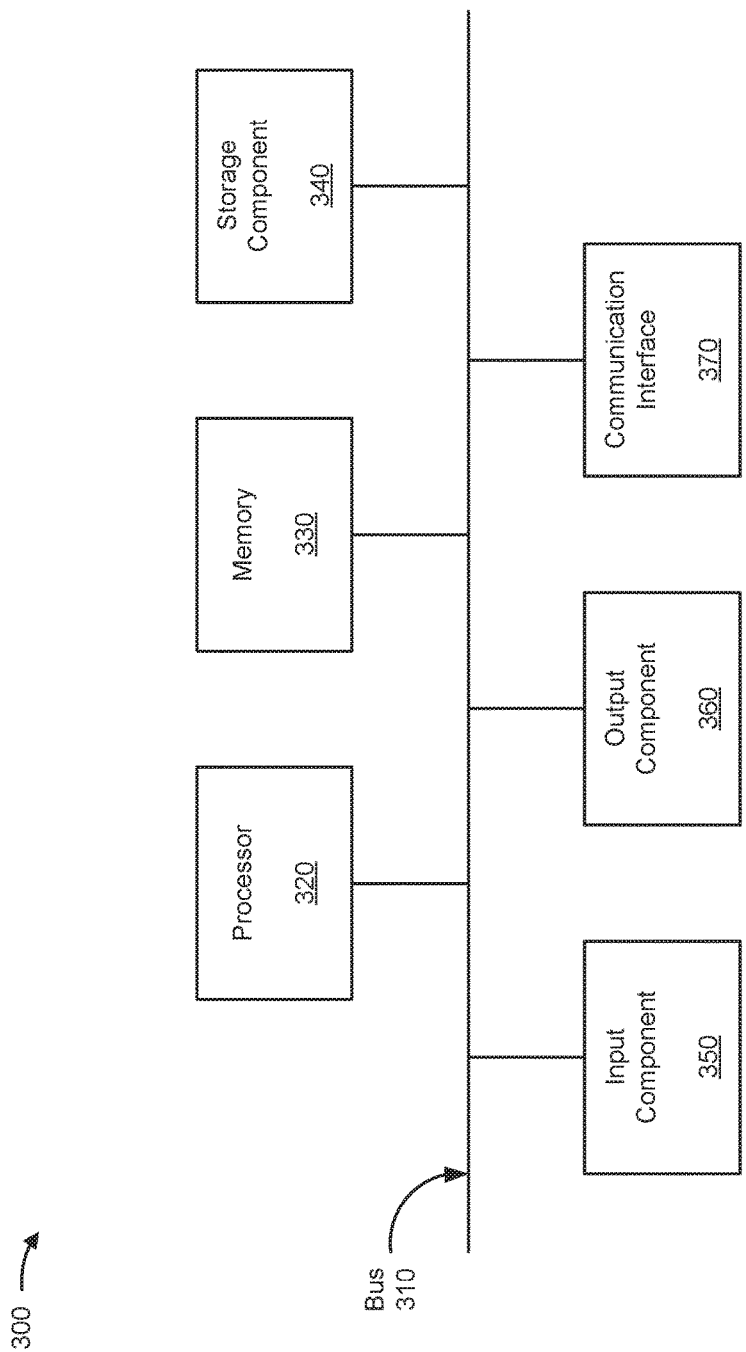
FIG. 3 is a diagram of example components of one or more devices of FIG. 2.

FIG. 3 is a diagram of example components of a device 300. Device 300 may correspond to power source 210, power system 220, system controller 230, PSM 240, system load 250, and/or user device 260. In some implementations, power source 210, power system 220, system controller 230, PSM 240, system load 250, and/or user device 260 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
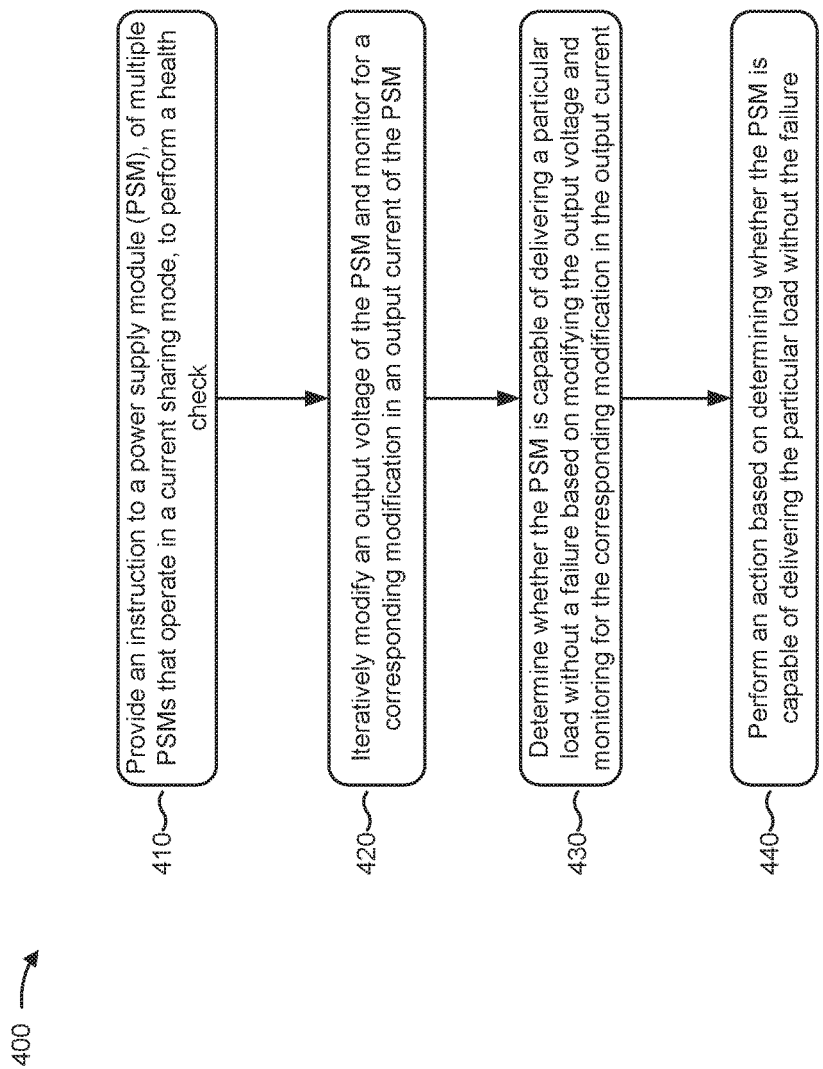
FIG. 4 is a flow chart of an example process for performing a health check on power supply modules (PSMs) that operate in a current sharing mode.

FIG. 4 is a flow chart of an example process 400 for performing a health check on PSMs that operate in a current sharing mode. In some implementations, one or more process blocks of FIG. 4 may be performed by power system 220. In some implementations, one or more process blocks of FIG. 4 may be performed by another device or a group of devices separate from or including power system 220, such as power source 210, system controller 230, PSM 240, system load 250, and/or user device 260.

As shown in FIG. 4, process 400 may include providing an instruction to a power supply module (PSM), of multiple PSMs that operate in a current sharing mode, to perform a health check (block 410). For example, power system 220 (e.g., system controller 230) may provide an instruction to PSM 240, of multiple PSMs 240 that operate in current sharing mode, to perform a health check. Here, system controller 230 may select PSM 240, from the multiple PSMs 240, as the PSM for performing the health check. In this case, system controller 230 may provide an instruction (e.g., by sending a signal), to PSM 240, instructing PSM 240 to perform the health check.

In some implementations, power system 220 (e.g., system controller 230) may provide an instruction to PSM 240, instructing PSM 240 to perform a health check that determines whether PSM 240 can deliver the maximum system load. For example, system controller 230 may determine whether PSM 240 can deliver the maximum system load by obtaining information that identifies the maximum power level of PSM 240, and comparing the maximum power level of PSM 240 to the maximum system load of power system 220.

In some implementations, prior to performing a health check on PSM 240, power system 220 (e.g., system controller 230) may obtain configuration information about power system 220. The configuration information may indicate, for example, a quantity of PSMs 240 included in power system 220, a PSM model number, a PSM power level (e.g., a maximum output voltage capacity), a power system architecture (e.g., N+1, N+N, etc.), a system sharing architecture (e.g., droop current share, active current share, etc.), or the like. System controller 230 may store the configuration information, and may access the configuration information when power system 220 performs the health check on PSM 240. For example, system controller 230 may store data indicating the number of PSMs 240 in the system, data indicating the maximum output voltage capacity associated with PSMs 240, data indicating the maximum system load of power system 220, or the like.

In some implementations, prior to performing a health check on PSM 240, power system 220 (e.g., system controller 230 and/or PSM 240) may disable a current sharing bus. A current sharing bus may be any device capable of permitting current sharing between multiple PSMs 240 (e.g., a bus, a switch, a router, a circuit, or the like), and may support both active current sharing and droop current sharing techniques. As an example, if power system 220 uses five PSMs 240 to support system load 250, and the current sharing bus is active, all five PSMs 240 may equally share the load (e.g., if the system load is 1000 W, every PSM may support 200 W). When power system 220 deactivates the current sharing bus, power system 220 may test individual PSMs 240 (e.g., by modifying the output voltage levels) to determine if individual PSMs 240 are capable of supporting the maximum system load.

In some implementations, prior to performing the health check on PSM 240, power system 220 (e.g., system controller 230) may reprogram the current share bus to allow dynamic current sharing levels. For example, system controller 230 may reprogram the current share bus to allow varied current share levels during the health check. In this case, system controller 230 may program the current share bus to adjust the current share levels when an event occurs. As an example, system controller 230 may program the current share bus to adjust the current share levels by a level that corresponds to the amount that the current level may change during the health check. For example, if PSM 240 performs a health check that requires iteratively modifying an output voltage of PSM 240, the re-programmed current share bus may dynamically increase or decrease the current share levels to match the iterative modification in output voltage during the health check. This allows power system 220 to perform the health check without disabling the current share bus. By reprogramming the current share bus, power system 220 ensures that other PSMs 240 (e.g., PSMs 240 not presently performing the health check) remain in an active current share state, where the other PSMs 240 may take over the full system load if the tested PSM 240 fails.

In some implementations, prior to performing the health check on PSM 240, power system 220 (e.g., system controller 230) may perform a safety check. For example, system controller 230 may perform a safety check to verify that power system 220 will continue to support the maximum system load if PSM 240 fails to deliver the maximum system load during the health check. As an example, backup PSMs 240 may be pre-programmed to deliver the full system load in case PSM 240 being tested fails to deliver the load during the health check. By allowing backup PSMs 240 to deliver the system load, system controller 230 may perform the health check on PSM 240 without risk of power system 220 failing to deliver the system load.

Additionally, or alternatively, power system 220 may monitor one or more other system parameters as part of the safety check, such as a temperature of power system 220 and/or one or more PSMs 240, a voltage of one or more PSMs 240, a current being supplied via power system 220, an amount of power being supplied by power system 220, or the like. In this case, power system 220 may ensure that a health check is performed only when conditions associated with power system 220 are favorable (e.g., when one or more system parameters satisfy one or more corresponding thresholds).

As further shown in FIG. 4, process 400 may include iteratively modifying an output voltage of the PSM and monitoring for a corresponding modification in an output current of the PSM (block 420). For example, one more devices of power system 220 (e.g., system controller 230 and/or PSM 240) may perform the health check by iteratively modifying an output voltage of PSM 240 and monitoring for a corresponding modification in an output current of PSM 240.

In some implementations, power system 220 (e.g., PSM 240) may perform the health check by iteratively increasing an output voltage of PSM 240. For example, one or more digital controllers of PSM 240 may iteratively increase the output voltage of PSM 240. In this case, the one or more digital controllers of PSM 240 may increase the output voltage by a set amount (e.g., by 10 millivolts (mV), 1 volt (V), etc.). By increasing the output voltage by a set amount, power system 220 may safely control the output voltage as the output voltage increases toward a maximum capacity, without risk of overheating, causing a short circuit, or causing another error in PSM 240.

While the one or more digital controllers of PSM 240 iteratively increase the output voltage of PSM 240, power system 220 (e.g., system controller 230 and/or PSM 240) may monitor for a corresponding modification in an output current of PSM 240. For every iterative output voltage increase, power system 220 may compare the output current level before the increase to the output current level after the increase, until a condition is satisfied that indicates PSM 240 has reached a maximum power level. As an example, power system 220 may store a value indicative of a first measured output current level, a value indicative of a second measured output current level, and may compare the first and second output current values to determine whether the condition is satisfied.

In some implementations, the condition may indicate that PSM 240 has reached the maximum power level when the value of the output current does not change after increasing the output voltage. For example, one or more digital controllers of PSM 240 may increase the output voltage level (e.g., by 1V), but the corresponding output current level may not increase (e.g., the output current before and after the output voltage increase may remain at 49A). This may indicate to power system 220 that PSM 240 is outputting a maximum power level. As another example, if one or more digital controllers of PSM 240 increase the output voltage level (e.g., by 1V), and the corresponding output current level increases (e.g., from 49A to 50A), then power system 220 may continue to iteratively increase the output voltage of PSM 240 until the condition is satisfied. When the condition is satisfied, power system 220 may stop the iterative modification to the output voltage.

Additionally, or alternatively, the condition may indicate that PSM 240 reaches the maximum power level when the value of the output voltage is equal to a prescribed maximum output voltage. For example, one or more digital controllers of PSM 240 may increase the output voltage level, which may increase the corresponding output current level. Here, power system 220 may store a prescribed maximum output voltage. If the prescribed maximum output voltage is equal to the output voltage level after the iterative increase, then power system 220 may stop iteratively increasing the output voltage. In this case, power system 220 and may multiply the output voltage level against the output current level and store the result as the maximum power level.

In some implementations, power system 220 (e.g., PSM 240) may perform the health check by iteratively decreasing an output voltage of PSM 240. For example, one or more digital controllers of PSM 240 may iteratively decrease the output voltage of PSM 240 and may monitor for a corresponding decrease in the output current of the selected PSM. Iteratively decreasing the output voltage of PSM 240 may allow power system 220 to determine whether PSM 240 is capable of delivering zero load without power system 220 shutting down due to overvoltage. In this case, as one or more digital controllers of PSM 240 decrease the output voltage by a set amount (e.g., by 1V, by 10 mV, etc.), power system 220 may rely on other PSMs 240 to deliver the remainder of the system load. However, an overvoltage condition may arise when the decrease in output voltage of PSM 240 causes a voltage spike that leads to loss of power. By checking for an overvoltage condition during testing, system controller 230 may take preventative and/or restorative action prior to power system 220 encountering an overvoltage condition during hours of peak system use.

Additionally, or alternatively, power system 220 (e.g., system controller 230 and/or PSM 240) may perform a temperature health check while iteratively modifying the output voltage of PSM 240. For example, power system 220 may perform a temperature health check to determine whether PSM 240 is operating within a prescribed temperature range. In this case, power system 220 may determine whether PSM 240 is operating within the prescribed temperature range by measuring the temperature (e.g., via a sensor) of PSM 240 and comparing the measured temperature to the prescribed temperature range. As an example, if system controller 230 determines that power system 220 is operating above the prescribed temperature range (e.g., above 40 degrees Celsius), system controller 230 may pause the health check until power system 220 is operating within the prescribed temperature range.

Additionally, or alternatively, power system 220 (e.g., system controller 230 and/or PSM 240) may monitor the input voltage while iteratively modifying the output voltage of PSM 240. For example, power system 220 may monitor the input voltage of PSM 240 to determine whether the input voltage is within a prescribed nominal input voltage range. As an example, power system 220 may measure an input voltage of 220V and may permit health checks within a nominal input voltage range of 200V-240V. Here, power system 220 may take periodic input voltage measurements of PSM 240 and may pause the health check if the input voltage falls outside of the prescribed nominal input voltage range (e.g., 200V-240V). As an additional example, if power system 220 determines that PSM 240 has an input voltage of 180V, PSM 240 may not be in a proper condition for a health check, and power system 220 may pause the health check to wait until power system 220 has an input voltage level within the prescribed nominal input voltage range.

As further shown in FIG. 4, process 400 may include determining whether the PSM is capable of delivering a particular load without a failure based on modifying the output voltage and monitoring for the corresponding modification in the output current (block 430). For example, power system 220 (e.g., system controller 230) may determine whether PSM 240 can deliver a particular load without a failure based on modifying the output voltage and monitoring for the corresponding modification in the output current. The particular load may be a maximum system load (e.g., the maximum power consumed by system load 250), a maximum potential power level (e.g., the maximum output voltage or power level described in the product specification of PSM 240), a zero-watt system load (e.g., PSM 240 supplies zero power), or the like.

In some implementations, power system 220 (e.g., system controller 230) may determine whether PSM 240 is capable of delivering a maximum system load without a failure. For example, system controller 230 may determine whether PSM 240 is capable of delivering a maximum system load without a failure by comparing the maximum system load of power system 220 to the maximum power level of PSM 240. In this case, system controller 230 may execute instructions that use comparators to determine whether PSM 240 may deliver the maximum system load without a failure. For example, when the maximum system load is less than or equal to the maximum power level of PSM 240, system controller 230 may determine that PSM 240 is capable of delivering the maximum system load without failure.

As an example, system controller 230 may compare a maximum power level of 1100 W to a maximum system load of 1000 W. By comparing the value of the maximum power level (e.g., 1100 W) to the value of the maximum system load (e.g., 1000 W), system controller 230 may determine that PSM 240 is operating in a state capable of delivering the maximum system load. As an additional example, system controller 230 may compare a maximum power level of 997 W to a maximum system load of 1000 W. By comparing the value of the maximum power level (e.g., 997 W) to the value of the maximum system load (e.g., 1000 W), system controller 230 may determine that PSM 240 is not operating in a state capable of delivering the maximum system load.

In some implementations, power system 220 (e.g., system controller 230) may determine whether PSM 240 is capable of delivering a maximum potential power level without a failure. For example, system controller 230 may determine whether PSM 240 is capable of delivering a maximum potential power level (e.g., as stated in the product specification of PSM 240) without a failure by comparing the maximum potential power level to the maximum power level obtained in block 420. Here, system controller 230 may access stored configuration information that indicates a value associated with the maximum potential power level of PSM 240. System controller 230 may compare the stored value associated with the maximum potential power level to the value associated with the maximum power level of PSM 240.

As an example, system controller 230 may determine that PSM 240 has a maximum power level of 1100 W, and may access stored configuration information indicating that PSM 240 has a maximum potential power level of 1200 W. System controller 230 may compare the maximum power level of 1100 W to the maximum potential power level of 1200 W. By comparing the value of the maximum power level (e.g., 1100 W) to the maximum potential power level (e.g., 1200 W), system controller 230 may determine that PSM 240 is not operating in a state capable of delivering the maximum potential output voltage. However, if power system 220 has a maximum system load of 1000 W, PSM 240 is still capable of delivering the 1000 W maximum system load. As a result, system controller 230 may provide alerts to user device 260 indicating that PSM 240 has a declining output voltage, allowing a user accessing user device 260 to take preventative and/or restorative action prior to PSM 240 failing to deliver the maximum system load.

In some implementations, power system 220 (e.g., system controller 230 and/or PSM 240) may determine whether PSM 240 is capable of delivering zero power (e.g., no load) without a failure. For example, power system 220 may determine whether PSM 240 is capable of delivering zero power without an overvoltage condition occurring. If power system 220 iteratively decreases the output voltage of PSM 240 to zero, and no overvoltage condition occurs, this may indicate that power system 220 is capable of supporting spikes in output voltage without the voltage spikes resulting in loss of power.

As further shown in FIG. 4, process 400 may include performing an action based on determining whether the PSM is capable of delivering the particular load without the failure (block 440). For example, power system 220 (e.g., system controller 230) may perform an action such as providing one or more pass or fail indicators to user device 260 based on whether PSM 240 is capable of delivering a particular load without failure. As an example, system controller 230 may provide a pass or fail indicator to user device 260 by sending a signal with a byte sequence indicating pass or fail.

In some implementations, system controller 230 may provide an indicator that PSM 240 passed the test. For example, system controller 230 may provide an alert to user device 260 that PSM 240 passed the test. As an example, system controller 230 may determine that PSM 240 is capable of delivering the maximum system load. Here, system controller 230 may send an alert to user device 260 to indicate that PSM 240 passed the test.

In some implementations, system controller 230 may provide an indicator that PSM 240 failed the test. For example, system controller 230 may provide an alert to user device 260 that PSM 240 failed the test. As an example, system controller 230 may determine that PSM 240 is not capable of delivering the maximum system load. Here, system controller 230 may send an alert to user device 260 to indicate that PSM 240 failed the test.

In some implementations, power system 220 (e.g., system controller 230) may provide multiple pass or fail indicators based on one or more health check factors. For example, system controller 230 may provide a first pass or fail indicator based on whether PSM 240 is capable of delivering the maximum system load and a second pass or fail indicator based on whether PSM 240 is capable of delivering the maximum potential power level. As an example, system controller 230 may determine that PSM 240 is capable of delivering the maximum system load but not capable of delivering the maximum potential power level described in the product specification of PSM 240. In this case, system controller 230 may send a first alert to user device 260 to indicate that PSM 240 is capable of delivering the maximum system load, and a second alert to user device 260 to indicate that PSM 240 is not capable of delivering the maximum potential power level described in the product specification of PSM 240. In this way, system controller 230 is able to identify PSMs 240 with a declining maximum power level and allows a user accessing user device 260 to take preventative and/or restorative action prior to PSMs 240 failing to deliver the maximum system load.

In some implementations, power system 220 (e.g., system controller 230) may wait to provide a pass or fail indicator to user device 260, and instead may provide pass or fail indicators for all PSMs 240 in one transmission after all health checks for power system 220 have completed. For example, system controller 230 may provide one or more pass or fail indicators to user device 260, for all PSMs 240, after all PSMs 240 have completed the health check.

In some implementations, power system 220 (e.g., system controller 230) may perform an automated action based on determining whether PSM 240 is capable of delivering the particular load without the failure. For example, system controller 230 may automatically shut down PSM 240 when PSM 240 fails the health check. In this case, system controller 230 may be automated to activate a backup PSM 240 to replace the faulty PSM 240. Here, the backup PSM 240 may be a PSM that was in an off state and not presently sharing the load of power system 220.

Additionally, or alternatively, power system 220 (e.g., system controller 230) may automatically schedule a technician to repair PSM 240 when PSM 240 fails the health check. For example, system controller 230 may automatically schedule a technician to repair PSM 240 by sending a signal (e.g., a text message) to a device accessible by a technician to indicate that PSM 240 needs repair. In addition, system controller 230 may create and send a work order and/or create a calendar entry for the requested repair. As an example, system controller 230 may create a work order for the repair that includes details of the fault (e.g., the maximum power level outputted by PSM 240 may be lower than the maximum power level that PSM 240 is capable of outputting when healthy), and may create a calendar entry detailing when the requested repair needs to be performed. By automating actions needed to repair PSM 240, power system 220 may reduce the risk of catastrophic loss of power.

In some implementations, process 400 may repeat until all PSMs 240 in power system 220 have received the health check. For example, after power system 220 (e.g., system controller 230) completes the health check on PSM 240, power system 220 may select a new PSM 240, perform the health check on the newly selected PSM 240, and repeat the process until all PSMs 240 have been tested. When process 400 completes the health check on all PSMs 240, system controller 230 may terminate the health check application. Additionally, or alternatively, power system 220 may enable current sharing after the health check for all PSMs 240 has been completed.

In some implementations, power system 220 (e.g., system controller 230) may perform process 400 at prescribed times. For example, system controller 230 may perform process 400 on a weekly or monthly basis to ensure that system redundancies of power system 220 remain operational. By performing periodic health checks on all PSMs 240, system controller 230 reduces the risk of catastrophic loss of power.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

By performing periodic health checks on individual PSMs 240 that operate within a group of PSMs 240 that use current sharing, power system 220 checks that individual PSMs 240 are capable of delivering the full system load in case of a failure by one or more of the other PSMs 240. Furthermore, power system 220 provides notice to user device 260 to allow preventative and/or restorative measures to be taken to avoid loss of power.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
select a power supply module (PSM), from a plurality of PSMs that operate in a current sharing mode, for performing a health check;
perform the health check on the selected PSM by iteratively modifying an output voltage of the selected PSM and monitoring for a corresponding modification in an output current of the selected PSM;
determine whether the selected PSM is capable of delivering a particular load without a failure based on performing the health check; and
perform an action based on whether the selected PSM is capable of delivering the particular load without the failure.

2. The device of claim 1, where the one or more processors are to:
disable the current sharing mode prior to performing the health check, or
reprogram the current sharing mode prior to performing the health check.

3. The device of claim 1, where the particular load is determined based on configuration information that indicates a maximum load deliverable by the selected PSM.

4. The device of claim 1, where the one or more processors, when iteratively modifying the output voltage and monitoring for the corresponding modification in the output current of the selected PSM, are to:
iteratively increase the output voltage and monitor for a corresponding increase in the output current of the selected PSM.

5. The device of claim 1, where the one or more processors, when iteratively modifying the output voltage and monitoring for the corresponding modification in the output current of the selected PSM, are to:
iteratively decrease the output voltage and monitor for a corresponding decrease in the output current of the selected PSM.

6. The device of claim 1, where the one or more processors, when determining whether the selected PSM is capable of delivering the particular load without the failure, are to:
determine whether the selected PSM is capable of delivering zero load without causing an overvoltage condition.

7. The device of claim 1, where the one or more processors, prior to performing the health check on the selected PSM, are to:
determine that one or more PSMs, of the plurality of PSMs, are capable of delivering an amount of power required by a system load; and
perform the health check based on determining that the one or more PSMs are capable of delivering the amount of power required by the system load.

8. A non-transitory computer-readable medium storing instructions, the instructions comprising:
one or more instructions that, when executed by one or more processors, cause the one or more processors to:
select a power supply module (PSM), from a plurality of PSMs that operate in a current sharing mode, for performing a health check;
perform the health check on the selected PSM by iteratively modifying an output voltage of the selected PSM and monitoring for a corresponding modification in an output current of the selected PSM;

stop iteratively modifying the output voltage of the selected PSM when the modification to the output voltage fails to correspond to the modification in the output current of the selected PSM;

determine whether the selected PSM is capable of delivering a particular load without a failure based on performing the health check; and perform an action based on whether the selected PSM is capable of delivering the particular load without the failure.

9. The non-transitory computer-readable medium of claim 8, where the one or more instructions, when executed by the one or more processors, further cause the one or more processors to:

disable the current sharing mode prior to performing the health check, or reprogram the current sharing mode prior to performing the health check.

10. The non-transitory computer-readable medium of claim 8, where the particular load is determined based on configuration information that indicates a maximum load deliverable by the selected PSM.

11. The non-transitory computer-readable medium of claim 8, where the particular load includes at least one of:

a maximum load associated with the selected PSM, a load required by a system powered by the plurality of PSMs, or a zero load.

12. The non-transitory computer-readable medium of claim 8, where the one or more instructions, that cause the one or more processors to perform the health check by iteratively modifying the output voltage and monitoring for the corresponding modification in the output current of the selected PSM, cause the one or more processors to:

perform the health check by iteratively increasing the output voltage and monitoring for a corresponding increase in the output current of the selected PSM.

13. The non-transitory computer-readable medium of claim 8, where the one or more instructions, that cause the one or more processors to perform an action based on determining whether the PSM is capable of delivering the particular load without the failure, cause the one or more processors to:

provide a status indicator that indicates whether the PSM is capable of delivering the particular load without the failure.

14. The non-transitory computer-readable medium of claim 8, where the one or more instructions, prior to causing the one or more processors to perform the health check on the selected PSM, further cause the one or more processors to:

determine that one or more PSMs, of the plurality of PSMs, are capable of delivering an amount of power required by a system load; and perform the health check based on determining that the one or more PSMs are capable of delivering the amount of power required by the system load.

15. A method, comprising:

selecting, by a device, a power supply module (PSM), from a plurality of PSMs that operate in a current sharing mode, for performing a health check;

performing, by the device, the health check on the selected PSM by iteratively modifying an output voltage of the selected PSM and monitoring for a corresponding modification in an output current of the selected PSM;

determining, by the device, whether the selected PSM is capable of delivering a particular load based on performing the health check; and performing, by the device, an action based on determining whether the selected PSM is capable of delivering the particular load.

16. The method of claim 15, further comprising:

disabling the current sharing mode prior to performing the health check, or reprogramming the current sharing mode prior to performing the health check.

17. The method of claim 15, where the particular load is determined based on configuration information that indicates a maximum load deliverable by the selected PSM.

18. The method of claim 15, where performing the health check by iteratively modifying the output voltage and monitoring for the corresponding modification in the output current of the selected PSM comprises:

increasing the output voltage iteratively and monitoring for a corresponding increase in the output current of the selected PSM.

19. The method of claim 15, where prior to performing the health check on the selected PSM, further comprises:

determining that one or more PSMs, of the plurality of PSMs, are capable of delivering an amount of power required by a system load; and performing the health check based on determining that the one or more PSMs are capable of delivering the amount of power required by the system load.

20. The method of claim 15, where iteratively modifying the output voltage and monitoring for the corresponding modification in the output current of the selected PSM further comprises:

stopping the iterative modification to the output voltage when the modification to the output voltage fails to correspond to a modification in the output current of the selected PSM.

* * * * *